(12) United States Patent
Rogers et al.

(10) Patent No.: US 8,398,744 B2
(45) Date of Patent: Mar. 19, 2013

(54) METHOD AND APPARATUS FOR AIR POLLUTION CONTROL

(75) Inventors: Bradley Stephen Rogers, Leawood, KS (US); James Easel Roberts, Kansas City, MO (US)

(73) Assignee: General Electric Company, Schenectady, NY (US)

( * ) Notice: Subject to any disclaimer, the term of this patent is extended or adjusted under 35 U.S.C. 154(b) by 386 days.

(21) Appl. No.: 12/886,627

(22) Filed: Sep. 21, 2010

(65) Prior Publication Data

US 2012/0067213 A1  Mar. 22, 2012

(51) Int. Cl.
*B03C 3/019*  (2006.01)
(52) U.S. Cl. ............... 95/62; 55/DIG. 25; 95/71; 95/78; 95/214; 96/52; 96/61; 96/74; 96/361; 96/365; 96/371; 96/373; 96/378
(58) Field of Classification Search ............... 95/58, 62, 95/71, 72, 78, 214; 96/52, 53, 61, 74, 355, 96/361, 365, 371, 373, 378; 55/341.1, DIG. 25; 110/215, 216, 345
See application file for complete search history.

(56) References Cited

U.S. PATENT DOCUMENTS

| | | | | |
|---|---|---|---|---|
| 2,935,375 A | * | 5/1960 | Boucher | 423/210 |
| 3,581,463 A | * | 6/1971 | Roberts | 95/58 |
| 4,072,477 A | * | 2/1978 | Hanson et al. | 95/71 |
| 4,378,976 A | * | 4/1983 | Rush | 95/29 |
| 4,987,839 A | * | 1/1991 | Krigmont et al. | 95/2 |
| 5,332,562 A | * | 7/1994 | Kersey et al. | 423/210 |
| 5,505,766 A | * | 4/1996 | Chang | 95/134 |
| 5,707,428 A | * | 1/1998 | Feldman et al. | 96/54 |
| 6,953,494 B2 | * | 10/2005 | Nelson, Jr. | 95/134 |
| 7,141,091 B2 | * | 11/2006 | Chang | 95/58 |
| 7,300,496 B2 | | 11/2007 | Taylor | |
| 2008/0060519 A1 | * | 3/2008 | Maly et al. | 95/107 |
| 2008/0115704 A1 | * | 5/2008 | Berry et al. | 110/203 |

FOREIGN PATENT DOCUMENTS

| | | | | | | |
|---|---|---|---|---|---|---|
| JP | 57-50560 | A | * | 3/1982 | | 95/58 |
| JP | 5-228330 | A | * | 9/1993 | | 95/58 |

* cited by examiner

*Primary Examiner* — Richard L Chiesa
(74) *Attorney, Agent, or Firm* — Cooper Legal Group, LLC

(57) ABSTRACT

A method, apparatus and system for minimizing a quantity of particulate matter entrained within a gas stream is provided. A coarse filter removes at least a portion of particulate matter having a relatively-large particle size from the gas stream. An agglomerator agglomerates particulate matter having a relatively-small particle size remaining in the gas stream into particulate clusters after the portion of the particulate matter having the relatively-large particle size has been removed by the coarse filter. An injector introduces an agglomerating material into the gas stream before the gas stream enters the agglomerator. The agglomerating material promotes agglomeration of the particulate matter having the relatively-small particle size into the particulate clusters. And a second filter receives the gas stream and removes at least a portion of the particulate clusters entrained within the gas stream exiting the agglomerator.

20 Claims, 3 Drawing Sheets

METHOD AND APPARATUS FOR AIR POLLUTION CONTROL

BACKGROUND OF THE INVENTION

1. Field of the Invention

The invention relates to the removal of pollutants from a gaseous stream and, more particularly, to a method and apparatus for filtering particulate matter from an exhaust gas.

2. Discussion of Prior Art

Industrial processes often involve the combustion of a fuel within a boiler to generate heat. Examples of the fuel include coal, wood, oil, natural gas or other suitably combustible material that is traditionally combusted in the presence of air or another oxygen source within the boiler. The heat generated from combustion of the fuel can be used to convert water into steam for driving a turbine, to heat an enclosure, or to perform another desired operation.

Boilers and other combustion sources of heat emit particulate and other pollutants entrained in their exhaust gas. Previous attempts to remove the pollutants from the exhaust emitted by a boiler have involved subjecting the exhaust gas to electrostatic precipitation followed by filtering the remaining pollutants from the exhaust gas using a fabric filter. Because electrostatic precipitation is effective in removing coarse pollutants the fabric filter of conventional systems has typically been exposed to fine particulate pollutants that are too small to be removed using electrostatic precipitation. To minimize the quantity of the fine particulate pollutants escaping the fabric filter the pore size of such filters can be designed as small as possible. However, the particle size of the fine particulate pollutants removed by the fabric filter is sufficiently small to form a dense dust cake on the fabric filter that eventually creates an unacceptably large pressure drop. To remove this dust cake high-pressure pulses of air or other cleaning gas are injected into the fabric filters. However, the high-pressure pulses can fatigue the fabric over time, thereby reducing the life of the fabric filters.

An example of a system to increase the particle size of the pollutants reaching the fabric filter to minimize the effect of cake formation can be found in U.S. Pat. No. 7,300,496 to Taylor, which is incorporated in its entirety herein by reference. Such a system involves the use of an agglomerator to combine fine particulate pollutants into larger masses that are then removed by the fabric filter. However, such agglomerator systems have traditionally been designed to treat the particulate matter that is embedded in the gas stream with the agglomerator positioned down stream of a primary collection device such as an electrostatic precipitator but upstream of a secondary filter. In the past, system designs did not take into account the injection of sorbents, for multi pollutant (examples being particulate, mercury, NOx, HCl, etc) reduction such as activated carbon, lime, etc downstream of a primary collection device such as an electrostatic precitator, multiclone, baghouse, etc but upstream of an agglomerator that in turn is positioned upstream of a secondary filter. In such a system that does not include the agglomerator technology, injected sorbents have been found to increase the rate of bag blinding and increase the system pressure drop.

Additionally, sorbent injection systems designed without the use of an agglomerator have been found not to achieve the same level of mixing of the sorbents in the gas flow. This poor mixing reduces the effectiveness of the sorbent to capture the targeted pollutants in the gas stream, allowing a sorbent-enriched gas stream including exposed sorbent to enter the fabric filter. The excess sorbent not combined with the particulate pollutants collects on the fabric filters, again causing filter blinding and a large pressure drop to be experienced by the system. Further, the adhesion between the fabric filters and the pollutants caused by the injected sorbent for multi-pollutant reduction makes cleaning the fabric filters difficult.

BRIEF DESCRIPTION OF THE INVENTION

Accordingly, there is a need in the art for a method and system to agglomerate particulate pollutants to be removed from a gas stream and to reduce the collection of the particulate pollutants on a filter from the level experienced by traditional methods and systems.

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides an apparatus for minimizing a quantity of particulate matter entrained within a gas stream is provided. A coarse filter removes at least a portion of particulate matter having a relatively-large particle size from the gas stream. An agglomerator agglomerates particulate matter having a relatively-small particle size remaining in the gas stream into particulate clusters after the portion of the particulate matter having the relatively-large particle size has been removed by the coarse filter. An injector introduces an agglomerating material or sorbent into the gas stream before the gas stream enters the agglomerator. The agglomerating material promotes agglomeration of the particulate matter having the relatively-small particle size into the particulate clusters. And a second filter receives the gas stream and removes at least a portion of the particulate clusters entrained within the gas stream exiting the agglomerator.

Another aspect of the invention provides an industrial system for generating heat and minimizing an amount of particulate pollutants emitted from the industrial system. The industrial system includes a combustion source to burn the fuel and generate heat, and a coarse filter that receives an exhaust gas from the combustion source and removes at least a portion of the particulate pollutants having a relatively-large particle size from the exhaust gas. An agglomerator agglomerates particulate pollutants having a relatively-small particle size remaining in the exhaust gas emitted from the course coarse filter into particulate clusters. An injector introduces an agglomerating material into the exhaust gas before the exhaust gas enters the agglomerator. The agglomerating material promotes agglomeration of the particulate pollutants having the relatively-small particle size into the particulate clusters. A second filter receives the exhaust gas subsequent to the agglomeration of the particulate pollutants and removes at least a portion of the particulate clusters entrained within the exhaust gas.

Another aspect of the invention provides a method of minimizing particulate matter from a gas stream, including removing a portion of particulate matter having a relatively-large particle size from the gas stream. Particulate matter having a relatively-small particle size remaining in the gas stream is agglomerated into particulate clusters after the portion of the particulate matter having the relatively-large particle size has been removed. An agglomerating material is introduced into the gas stream before the gas stream is received by an agglomerator that emits the gas stream including the particulate clusters. The agglomerating material promotes agglomeration of the particulate matter having the relatively-small particle size into the particulate clusters. At least a portion of the particulate clusters is filtered from the gas stream exiting the agglomerator.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
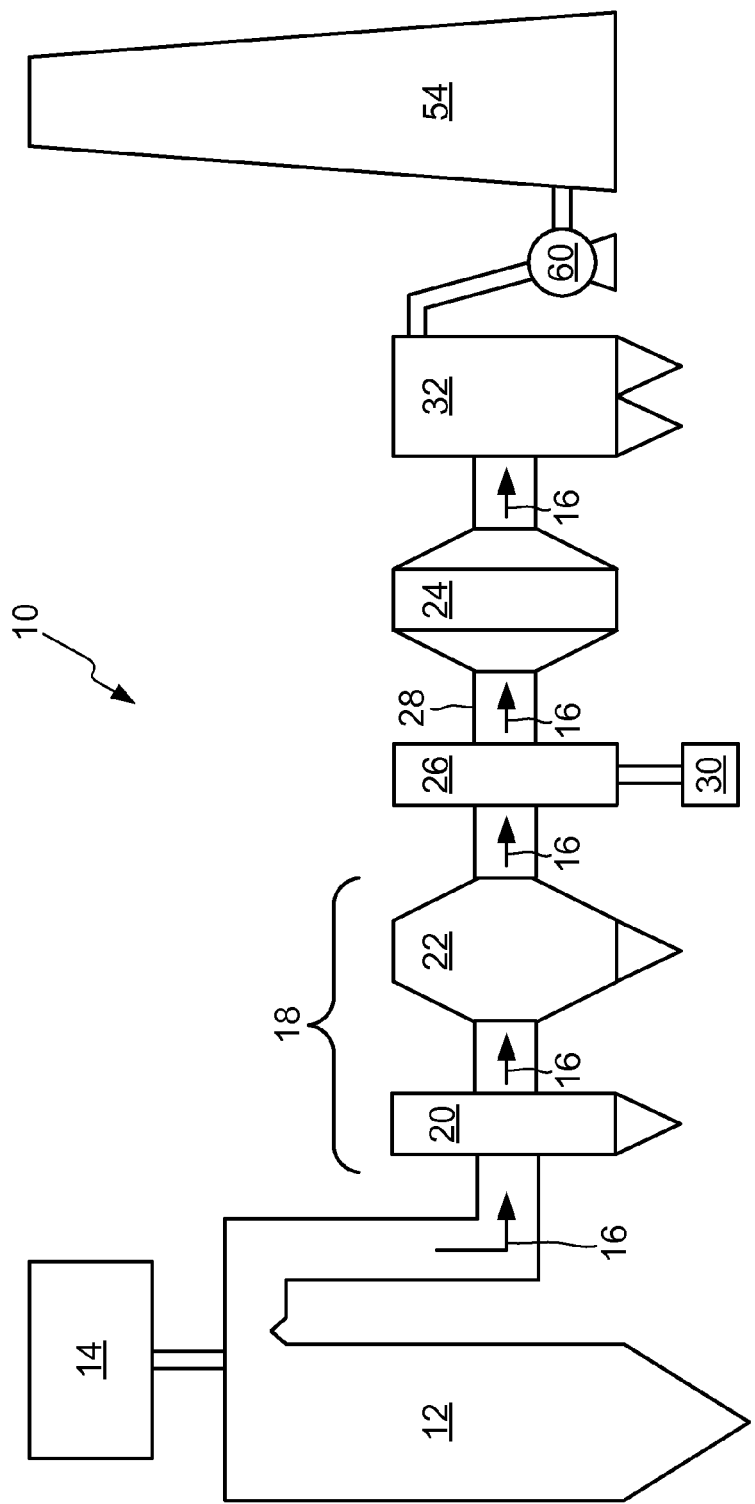
FIG. 1 is a schematic representation of an embodiment of an industrial system including a system for filtering at least a portion of a particulate pollutant from an exhaust gas and minimizing collection of the particulate pollutant on a filter medium.

Illustrative embodiments that incorporate one or more aspects of the invention are described and illustrated in the drawings. These illustrated examples are not intended to be overall limitations on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An illustrative embodiment of an industrial system 10 is shown in FIG. 1. The industrial system 10 shown includes a combustion source 12 in which a fuel is combined with oxygen and combusted for generating heat to be utilized by the industrial system 10. The oxygen combined with the fuel can be supplied from ambient air, a source of substantially-pure oxygen, or a combination thereof. The combustion source 12 can be a boiler operable to combust a solid fossil fuel such as coal or any other combustible fuel such as natural gas, wood, waste products, and the like. According to alternate embodiments, the combustion source 12 can be any heat-generating apparatus such as a waste incinerator. Regardless of the particular configuration, the combustion source 12 emits particulate matter such as a particulate pollutant, combustion byproduct, fuel that is not fully combusted, and the like entrained within an exhaust gas emitted from the combustion source 12. According to yet other embodiments, instead of the combustion source 12, any industrial apparatus emitting a particulate-matter laden gas from which the particulate matter is to be removed via filtration can be included in the industrial system 10. To clearly describe the technology and for the sake of brevity, however, the industrial system 10 shown in FIG. 1 includes a combustion source 12 in the form of a coal-fired boiler that combusts coal in the presence of oxygen for generating heat to convert water into steam. The steam from the combustion source 12 in FIG. 1 can optionally be transported to a load 14 which, in the present example, is a steam-driven electric generator for generating electric power. However, according to alternate embodiments, the load can be a building or other enclosure to be heated with the steam, or any load such as industrial processing equipment requiring heat.

The combustion source emits an exhaust gas 16 (represented schematically by arrows) laden with particulate matter that is to be at least partially removed from the exhaust gas 16 before the exhaust gas 16 is released into the atmosphere. The particulate matter can be a particulate pollutant, the emission of which into the environment is to be reduced from the levels initially present in the exhaust gas 16 emitted from the combustion source; a combustion byproduct; uncombusted fuel; or any combination thereof. Such particulate matter typically includes a wide range of different particle sizes. For purposes of the present technology, the particulate matter can be considered to have a relatively-large particle size and a relatively-small particle size. As the names indicate, the particulate matter having the relatively-small particle size is smaller in dimension than the particulate matter having the relatively-large particle size. Thus, a finer filter is required to filter the particulate matter having the relatively-small particle size than required to filter the particulate matter having the relatively-large particle size.

The exhaust gas 16 exiting the combustion source 12 is delivered to a coarse filter 18 that is to remove at least a portion of the particulate matter having the relatively-large particle size from the exhaust gas 16. The coarse filter 18 allows a portion of the particulate matter having the relatively-small particle size to remain in the exhaust gas 16.

The coarse filter 18 can be any suitable filtration apparatus, but appears in the illustrative embodiment shown in FIG. 1 as including a multiclone 20 provided in series with an electrostatic precipitator 22. However, it is to be understood that the coarse filter 18 can include a multiclone 20, an electrostatic precipitator 22, a baghouse (similar to the baghouse 32 described below), a combination including a plurality of the multiclone 20, the electrostatic precipitator 22 and baghouse arranged in series, or any other suitable filtration apparatus such as a fabric filter, a $SO_2$ scrubber, and other suitable filtration devices, alone or in any combination, for the removal of a significant portion of the particulate matter having the relatively-large particle size, and optionally, a portion of the particulate matter having the relatively-small particle size. The illustrative embodiment of the coarse filter 18 including the multiclone 20 arranged in series with the electrostatic precipitator 22 will simply be used from this point forward for the sake of brevity to clearly describe the subject technology. According to the present embodiment, the coarse filter 18 can remove from about 70% to about 99.9%, and possibly more of the particulate matter (including both the relatively-large and relatively-small particle sizes).

The multiclone 20 is operable to remove particulate matter having a particle size that is approximately 15 microns and larger from the exhaust gas emitted from the combustion source 12. A generally rectangular housing encloses a plurality of tubes forming individual centrifugal collectors. Particulate matter entering the multiclone 20 is blown or otherwise directed in an arcuate pattern to expose the particulate matter to a centrifugal force. The centrifugal force urges the particulate matter toward a boundary surface of the tubes. Upon reaching the boundary surface the particulate matter can fall under the force of gravity in a generally downward direction into a somewhat pyramidal hopper, from where it can be collected. Exhaust gas 16 with the particulate matter at least partially removed exits the multiclone 20 and is subsequently delivered to the electrostatic precipitator 22 for the embodiment shown in FIG. 1.

For embodiments including both the multiclone 20 and electrostatic precipitator 22 in series as shown in FIG. 1, the exhaust gas 16 emitted from the multiclone 20 is delivered to the electrostatic precipitator 22. For other embodiments including an electrostatic precipitator 22 without the multiclone 20, the exhaust gas 16 emitted from the combustion source 12 can be delivered to the electrostatic precipitator 22 without first being delivered to the multiclone 20. Other embodiments can include delivery of the exhaust gas 16 to any suitable coarse filter 18.

Generally, the electrostatic precipitator 22 electrostatically charges the particulate matter in the exhaust gas entering the electrostatic precipitator 22. Collector plates or other collection structures suspended within the electrostatic precipitator 22 are provided with a charge opposite of that provided to the particulate matter. The electrostatically-charged particulate matter particles are attracted to the oppositely-charged collector plates, and as a result, are deposited onto those collector plates. Occasionally, when enough of the particulate matter from the exhaust gas 16 has accumulated on the collector plates, the charge provided to the particulate matter accumulated on the collector plates and/or the collector plates themselves can be dissipated. The collector plates are then rapped, struck or otherwise agitated to cause the accumulated particulate matter to fall under the force of gravity into an underlying hopper, from where it can be collected and disposed of.

Regardless of the configuration of the filter 18, the exhaust gas 16 exiting the coarse filter 18 includes less particulate matter entrained therein than the exhaust gas 16 entering the coarse filter 18. Substantially all of the particulate matter entrained within the exhaust gas 16 exiting the coarse filter 18 is of the relatively-small particle size variety.

Downstream from the coarse filter 18 an agglomerator 24 is provided. It is to be appreciated that a first location being described as "upstream" relative to a second location herein means that the first location is encountered by the exhaust gas 16 before the second location is encountered by the exhaust gas 16 as the exhaust gas 16 travels in a direction away from the combustion source 12, through the coarse filter 18, and so on as shown in FIG. 1. Likewise, the second location encountered by the exhaust gas 16 after the first location is said to be "downstream" of the first location.

The agglomerator 24 can include a housing defining an enclosure in which the particulate matter having the relatively-small particle size that remains in the exhaust gas 16 emitted from the coarse filter 18 agglomerates into collections of particulate matter grouped together. These collections of particulate matter are referred to herein as "particulate clusters", and include a plurality of individual particles of the particulate matter adhered together by an agglomerating material.

Upstream of the agglomerator 24 in the embodiment shown in FIG. 1 is an injector 26 that introduces an agglomerating material into the exhaust gas 16 before the exhaust gas 16 enters the agglomerator 24. The injector 26 can optionally be disposed immediately upstream of the agglomerator 24, without any intervening process equipment other than transport equipment such as a conduit 28, for example, separating the injector 26 from the agglomerator 24. Further, the injector 26 can be disposed operatively between the coarse filter 18 and the agglomerator 24 (i.e., downstream of the coarse filter 18, but upstream of the agglomerator 24). The injector 26 can include any material handling apparatus suitable for introducing the particular agglomerating material chosen for a given process to the exhaust gas 16 upstream of the agglomerator 24. For example, the injector 26 can include one or a plurality of nozzles (not shown) with an outlet port exposed to an interior of the conduit 28, for example, through which a liquid agglomerating material can be injected into the exhaust gas 16 as it travels through the conduit 28 to be delivered to the agglomerator 24. Regardless of the configuration of the injector 26, introducing the agglomerating material to the exhaust gas 16 upstream of the agglomerator 24 allows suitable mixing of the particulate matter having the relatively-small particle size within the agglomerator 24. The enhanced mixing afforded by introducing the agglomerating material into the exhaust gas 16 upstream of the agglomerator 24 minimizes the quantity of such particulate matter exiting the agglomerator 24 as individual particles or very small particulate clusters. Instead, the enhanced mixing promotes the formation of large particulate clusters that can be easily filtered after exiting the agglomerator 24 as described below.

The agglomerating material promotes agglomeration of the particulate matter having the relatively-small particle size into the particulate clusters. The agglomerating material can optionally form an adhesion between individual particles of the particulate matter having the relatively-small particle size, holding them together once they contact each other. According to alternate embodiments, the agglomerating material can be a sorbent, which can absorb and/or adsorb the particulate matter entrained in the exhaust gas 16. The agglomerating material selected for a given application can optionally be specific to the particulate matter having the relatively-small particle size that is to be agglomerated into the particulate clusters, or specific to a group of related types of particulate matter. For example, ammonia stored in a reservoir 30 in fluid communication with the injector 26 can be injected by the injector 26 into the exhaust gas 16 within the conduit 28 en route to being delivered to the agglomerator 24. The ammonia can establish an adhesive coating on portions of dust particles entrained with the exhaust gas 16. Other dust particles contacting the adhesive coating created with the ammonia will adhere thereto, forming part of a particulate cluster.

As another example, an agglomerating material for promoting agglomeration of mercury molecules entrained with the exhaust gas 16 can be injected via the injector 26 into the exhaust gas 16. Such an agglomerating material, if captured among the particulate matter removed from the exhaust gas 16 via the coarse filter 18, can interfere with disposal of the particulate matter removed with the coarse filter 18. Accordingly, introducing this agglomerating material into the exhaust gas 16 downstream of the coarse filter 18 avoids such a disposal problem. Further, introducing the agglomerating material into the exhaust gas 16 upstream of the agglomerator 24 allows the combination of the agglomerating material and the particulate matter with the relatively-small particle size to thoroughly mix, and form large particulate clusters within the agglomerator 24. Examples of suitable agglomerating materials include, but are not limited to: sulfuric acid, ammonia, activated carbon, limestone, and other additives specifically adapted for promoting agglomeration.

Figure 2:
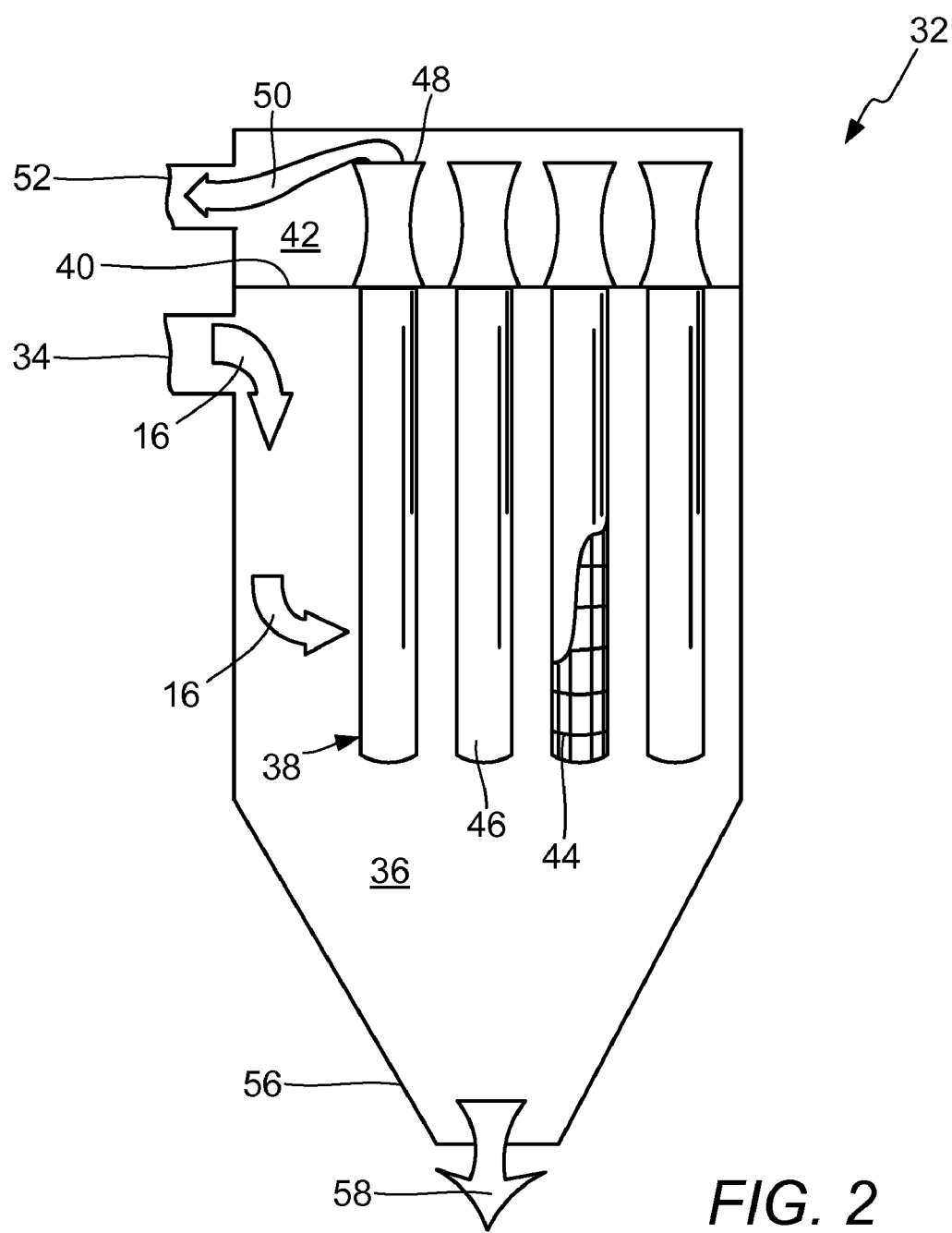
FIG. 2 is a cutaway view of an embodiment of a reverse-pulse-jet baghouse for filtering particulate clusters from a gas.

After exiting the agglomerator 24 the exhaust gas with the entrained particulate clusters are delivered to a baghouse 32 or other suitable collection apparatus. Examples of the baghouse 32 shown in FIG. 1 include a mechanical shaker, a reverse air, a reverse pulse jet, or any other desired baghouse 32 configuration. The embodiment of the baghouse 32 shown in FIG. 2 is what is commonly referred to as a reverse-pulse-jet baghouse 32. During normal operation the exhaust gas 16 laden with the particulate clusters exiting the agglomerator 24 (FIG. 1) is delivered to the baghouse 32. The exhaust gas 16 enters an inlet port 34 (FIG. 2) and enters a chamber 36 in which a plurality of filters 38 are suspended from a partition 40 separating the chamber 36 from a clean gas chamber 42. Each filter 38 includes a substantially-rigid support structure 44 (shown in the partially cutaway view of a filter 38 in FIG. 2) formed as a cage or network of wire or other suitable material that allows the exhaust gas 16 to enter an interior of the filters 38. A fabric 46 or other suitably porous filtering material encloses the support structure 44 to filter the particulate clusters from the exhaust gas 16. The exhaust gas 16 passes through the fabric 46 covering the support structure 44, thereby filtering the particulate clusters from the exhaust gas 16 before passing through apertures in the partition 40, exiting a nozzle 48 and entering the clean gas chamber 42. The clean exhaust gas 50 exiting the baghouse 32 through an outlet port 52 can be delivered to a stack 54 (FIG. 1) through which the clean exhaust gas 50 (FIG. 2) can be released into the atmosphere.

Occasionally, a pulse of compressed air or other suitably-pressurized gas can be injected into the nozzles 48 in a direction opposite to the direction in which the clean exhaust gas exits the nozzles 48 (i.e., from the clean gas chamber 42 into the chamber 36). Doing so ejects at least a portion of the particulate clusters from the fabric 46 of the filters 38. The ejected particulate clusters to fall in the direction of arrow 58 under the force of gravity into a hopper portion 56 of the baghouse 32, from where it can be removed and disposed of.

As the particulate clusters accumulate on the fabric 46 (FIG. 2) of the filters 38, the pressure required to force the exhaust gas from the chamber 36 into the clean gas chamber 42 through the filters 38 increases. To overcome the increased pressure requirements, an air mover 60 (FIG. 1) such as a selectively-operable fan, blower, and the like can be provided to urge the exhaust gas 16 through the filters 38 with the accumulated particulate clusters and into the clean gas chamber 42.

Figure 3:
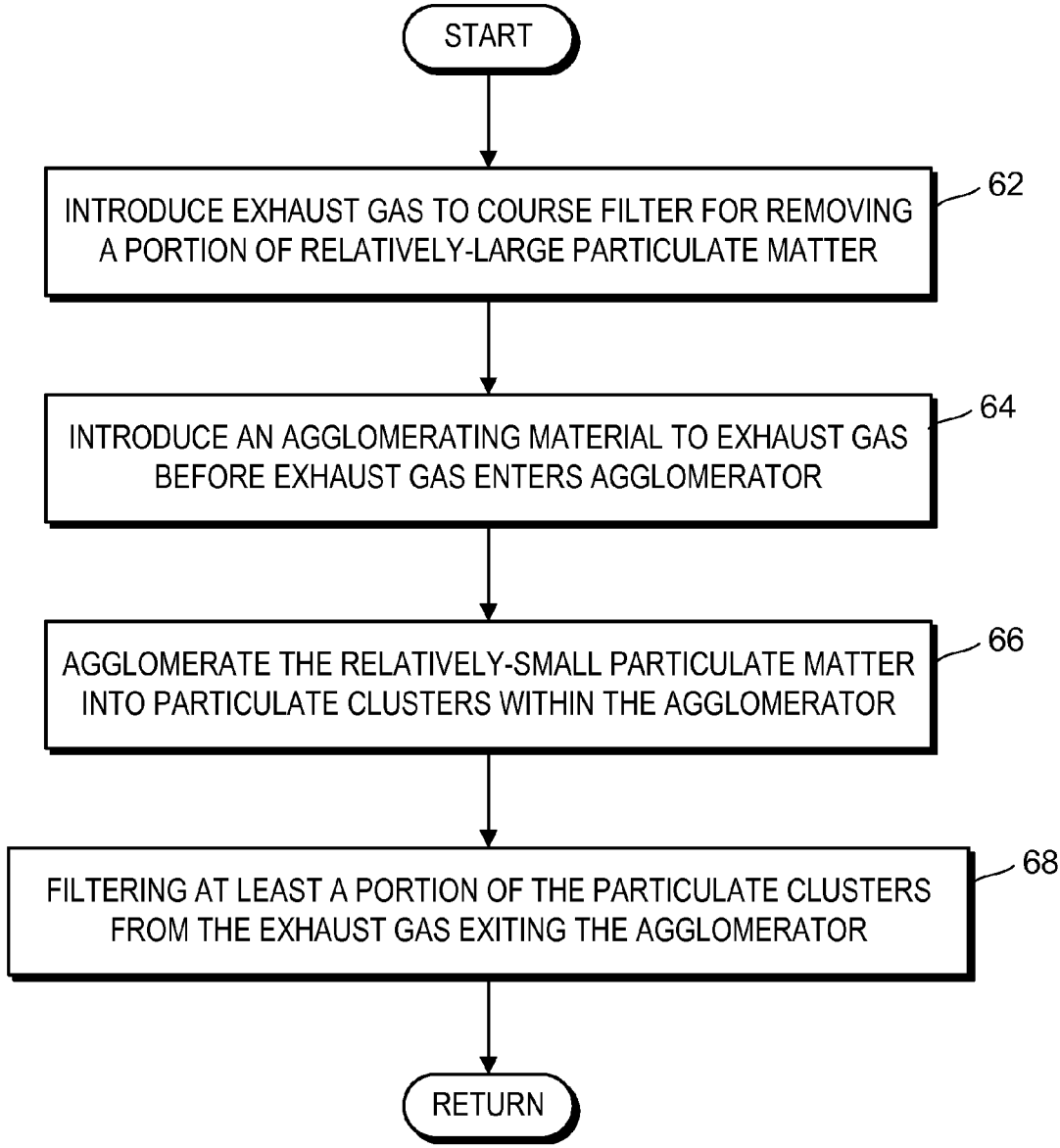
FIG. 3 is a flow diagram illustrating an embodiment of a method of minimizing particulate matter from a gas stream.

A method of minimizing particulate matter from a gas stream can be understood with reference to FIG. 3. For the illustrated embodiment, the exhaust gas 16 exiting the combustion source 12 (FIG. 1) laden with the particulate matter is introduced to the coarse filter 18 for removing a portion of particulate matter having a relatively-large particle size from the gas stream at step 62 (FIG. 3). Subsequent to removing the portion of particulate matter having the relatively-large particle size, an agglomerating material is introduced at step 64 into the exhaust gas 16 (FIG. 1) upstream of the agglomerator 24. The agglomeration material promotes agglomeration of particulate matter having the relatively-small particle size into larger particulate clusters. At step 66 (FIG. 3), and after the portion of the particulate matter having the relatively-large particle size has been removed, the particulate matter having the relatively-small particle size remaining in the exhaust gas is agglomerated into the particulate clusters in the agglomerator 24 (FIG. 1), and the particulate clusters maintain substantially intact due to the presence of the agglomerating material. At least a portion of the particulate clusters are filtered from the exhaust gas 16 (FIG. 1) exiting the agglomerator 24 at step 68 (FIG. 3) before the clean exhaust gas 50 (FIG. 2) is vented to the atmosphere through the stack 54 (FIG. 1).

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An apparatus for reducing a quantity of particulate matter entrained within a gas stream, the system including:
    a coarse filter that removes at least a portion of particulate matter having a relatively-large particle size from the gas stream;
    an agglomerator that agglomerates particulate matter having a relatively-small particle size remaining in the gas stream into particulate clusters after the portion of the particulate matter having the relatively-large particle size has been removed by the coarse filter;
    an injector that introduces an agglomerating material into the gas stream before the gas stream enters the agglomerator, wherein the agglomerating material promotes agglomeration of the particulate matter having the relatively-small particle size into the particulate clusters; and
    a second filter that receives the gas stream and removes at least a portion of the particulate clusters entrained within the gas stream exiting the agglomerator.

2. The apparatus according to claim 1, wherein the coarse filter includes at least one of a multiclone, a baghouse and an electrostatic precipitator.

3. The apparatus according to claim 2, wherein the coarse filter includes a plurality or all of the multiclone, the baghouse and the electrostatic precipitator in series.

4. The apparatus according to claim 1, wherein the injector is operatively disposed between the coarse filter and the agglomerator.

5. The apparatus according to claim 1, wherein the agglomerating material includes at least one of: sulfuric acid, ammonia, activated carbon, and limestone.

6. The apparatus according to claim 1, wherein the second filter includes a fabric filter supported within a baghouse enclosure.

7. The apparatus according to claim 6, wherein the baghouse enclosure includes a plurality of fabric filters at least partially enclosing a support structure coupled to a partition, wherein at least a portion of the particulate clusters accumulated on the fabric filters is removed with a pulse of compressed air.

8. The apparatus according to claim 1 further including an air mover that is selectively operable to elevate a pressure of the gas stream to maintain receipt of the gas stream by the second filter when the particulate clusters have formed on a portion of the second filter.

9. An industrial system for generating heat and reducing an amount of particulate pollutants emitted from the industrial system, the industrial system including:
    a combustion source to burn the fuel and generate heat;
    a coarse filter that receives an exhaust gas from the combustion source and removes at least a portion of the particulate pollutants having a relatively-large particle size from the exhaust gas;
    an agglomerator that agglomerates particulate pollutants having a relatively-small particle size remaining in the exhaust gas emitted from the coarse filter into particulate clusters;
    an injector that introduces an agglomerating material into the exhaust gas before the exhaust gas enters the agglomerator, wherein the agglomerating material promotes agglomeration of the particulate pollutants having the relatively-small particle size into the particulate clusters; and
    a second filter that receives the exhaust gas subsequent to the agglomeration of the particulate pollutants and removes at least a portion of the particulate clusters entrained within the exhaust gas.

10. The industrial system according to claim 9, wherein the coarse filter includes at least one of a multiclone, a baghouse and an electrostatic precipitator.

11. The industrial system according to claim 10, wherein the coarse filter includes a plurality or all of the multiclone, the baghouse and the electrostatic precipitator in series.

12. The industrial system according to claim 9, wherein the injector is operatively disposed between the coarse filter and the agglomerator.

13. The industrial system according to claim 9, wherein the second filter includes a plurality of fabric filters at least partially enclosing a support structure coupled to a partition supported within a baghouse enclosure, and at least a portion of the particulate clusters accumulated on the fabric filters is removed with a pulse of compressed air.

14. The industrial system according to claim 9, wherein the combustion source is a coal-fired boiler that is to generate heat to convert water into steam, the industrial system further including a load that is to be driven by the steam generated by the boiler.

15. A method of reducing particulate matter from a gas stream, the method including:
    removing a portion of particulate matter having a relatively-large particle size from the gas stream using a coarse filter;
    agglomerating particulate matter having a relatively-small particle size remaining in the gas stream into particulate clusters after the portion of the particulate matter having the relatively-large particle size has been removed;
    introducing an agglomerating material into the gas stream before the gas stream is received by an agglomerator that emits the gas stream including the particulate clusters using an injector, wherein the agglomerating material promotes agglomeration of the particulate matter having the relatively-small particle size into the particulate clusters; and
    filtering at least a portion of the particulate clusters from the gas stream exiting the agglomerator.

16. The method according to claim 15, wherein said introducing the agglomerating material is performed between the coarse filter for removing the portion of the particulate matter having the relatively-large particle size from the gas stream and an agglomerator that agglomerates the particulate matter having the relatively-small particle size into the particulate clusters.

17. The method according to claim 15, wherein said removing the portion of particulate matter having the relatively-large particle size from the gas stream includes electrostatically precipitating the particulate matter having the relatively-large particle size from the gas stream.

18. The method according to claim 15, wherein said removing the portion of particulate matter having the relatively-large particle size from the gas stream includes centrifugally removing the portion of particulate matter having the relatively-large particle size from the gas stream, wherein said centrifugally removing includes:
    imparting a centrifugal force on the portion of particulate matter having the relatively-large particle size to urge the portion of particulate matter having the relatively-large particle size toward a boundary surface, and
    gravitationally collecting the portion of particulate matter having the relatively-large particle size that is urged toward the boundary surface.

19. The method according to claim 15, wherein said removing the portion of particulate matter having the relatively-large particle size from the gas stream includes both:
    electrostatically precipitating the particulate matter having the relatively-large particle size from the gas stream; and
    centrifugally removing the portion of particulate matter having the relatively-large particle size from the gas stream, said centrifugally removing including:
    imparting a centrifugal force on the portion of particulate matter having the relatively-large particle size to urge the portion of particulate matter having the relatively-large particle size toward a boundary surface, and
    gravitationally collecting the portion of particulate matter having the relatively-large particle size that is urged toward the boundary surface.

20. The method according to claim 15, wherein said removing the portion of particulate matter having the relatively-large particle size from the gas stream includes introducing the gas stream including the particulate matter having the relatively-large particle size into a baghouse arranged downstream of a combustion source that burns fuel and emits the gas stream to generate heat.

* * * * *